United States Patent [19]

Dixon et al.

[11] 3,923,827
[45] Dec. 2, 1975

[54] PREPARATION OF 4-IMIDAZOLIN-2-ONES

[75] Inventors: William D. Dixon, Kirkwood; Bracey R. Dangerfield, St. Louis, both of Mo.

[73] Assignee: Monsanto Company, St. Louis, Mo.

[22] Filed: Nov. 19, 1974

[21] Appl. No.: 525,257

Related U.S. Application Data

[62] Division of Ser. No. 376,494, July 5, 1973, abandoned.

[52] U.S. Cl. ..... 260/309.6; 260/553 A; 260/583 G; 424/273
[51] Int. Cl.² .......................................... C07D 49/34
[58] Field of Search .................................. 260/309.6

[56] References Cited
UNITED STATES PATENTS

| | | | |
|---|---|---|---|
| 3,136,776 | 6/1964 | Stoffel | 260/309.6 |
| 3,355,457 | 11/1967 | Wright, Jr. et al | 260/309.6 |
| 3,723,455 | 3/1973 | Chupp | 260/309.6 |

OTHER PUBLICATIONS

Theilheimer, Synthetic Methods of Organic Chemistry, p. 176, S. Karger, New York, 1964.
Theilheimer, Synthetic Methods of Organic Chemistry, p. 206, S. Karger, N.Y., 1964.

*Primary Examiner*—Ethel G. Love
*Attorney, Agent, or Firm*—Richard H. Shear

[57] ABSTRACT

A class of 4-imidazolin-2-ones are prepared by the cyclization of a urea prepared by the reaction of 2-haloalken-1-yl amine and an isocyanate. The 4-imidazolin-2-ones are useful as intermediates in the manufacture of plant regulants. Representative of this class is 1-isopropyl-3-(3,4-dichlorophenyl)-4-methyl-4-imidazolin-2-one.

5 Claims, No Drawings

PREPARATION OF 4-IMIDAZOLIN-2-ONES

This is a division of application Ser. No. 376,494 filed July 5, 1973, now abandoned.

This invention relates to the synthesis of useful 4-imidazolin-2-ones and to new and useful N-(2-halo-2-alken-1-yl) urea precursors therefor.

The 4-imidazolin-2-ones prepared in accordance with this invention can be represented by the following formula (1) 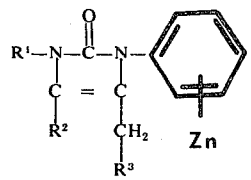

wherein $R^1$ is lower alkyl, $R^2$ is lower alkyl or, and preferably, hydrogen, $R^3$ is lower alkyl or hydrogen, Z is fluoro, chloro, bromo lower alkyl, halo lower alkyl or lower alkoxy and $n$ is an integer zero through 2.

The N-(2-halo-alken-lyl-) urea provided by this invention as precursors for the above described 4-imidazolin-2-ones can be represented by the following formula (2) 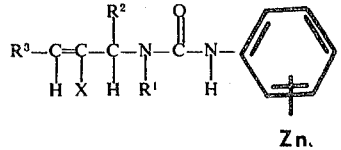

wherein X is halo, preferably chloro or bromo and $R^1$, $R^2$, $R^3$, Z and $n$ are as defined above in formula (1).

The N-(2-halo-2-alken-1-yl) ureas can be prepared by reacting on appropriate (2-halo-2-alken-1-yl) amine with an appropriate isocyanate set forth schematically as follows

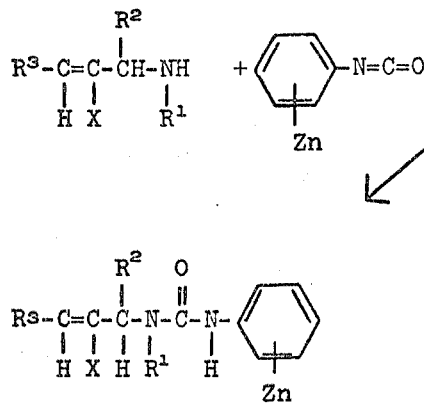

where $R^1$, $R^2$, $R^3$, X, Z and $n$ are as previously defined.

As employed herein, the term "lower" designates those aliphatic radicals of not more than 4 carbon atoms in straight or branched chain. Representative lower alkyl substituents are methyl, ethyl, propyl, isopropyl, butyl, tert. butyl and the like. Where the substituent is alkoxy, it can be methoxy, ethoxy, propoxy, isopropoxy, butoxy, sec. butoxy and the like. When $n$ is 2 the substituents represented by Z can be like or unlike.

The reaction of the appropriate amine and the isocyanate is well understood by those skilled in the art. In general the reaction is conducted in the presence of an inert solvent, for example ethers, such as, diethyl ether, di-isoproyl ether, methylbutyl ether tetrahydrofuran, the alkanes, such as n-hexane, n-heptane, cyclohexane, the esters, such as, ethyl acetate, propyl acetate, and other solvents. The ethers are generally preferred for convenience. The temperature of the reaction is not critical and will depend upon the particular reactants and in general will be between room temperature and the reflux temperature of the system. The ratio of the reactants can vary using either a slight excess of the amine or the isocyanate. Usually the reactants are used in a ratio of 1:1. Recovery of the desired urea can be obtained by various means such as filtration, washing, evaporation of the solvent and the like. Purification of the urea often is not required in order to produce the 4-imidazolin-2-ones in accordance with the instant invention.

The required 2-halo-2-alken-1-yl amines and appropriate isocyanates are readily prepared by methods known in the art. For example, U.S. Pat. No. 2,278,527 to F. F. Rust and W. E. Vaughan describe a vapor phase process of halogenating via substitution of halo-substituted unsaturated hydrocarbons using oxygen to catalyze the reaction. Such halogenated halo-substituted olefins can be reacted with a primary amine to form the appropriate 2-halo-2-alken-1-yl amine as shown schematically as follows

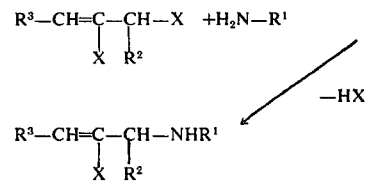

where $R^1$, $R^2$, $R^3$, and X are as previously defined.

The above secondary amine is reacted with an aryl isocyanate using well known procedures to prepare the novel ureas as shown schematically

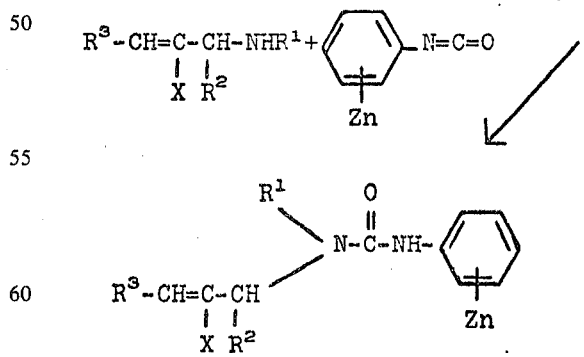

where $R^1$, $R^2$, $R^3$, X, Z and n are as previously defined.

The above novel ureas are required as intermediates in the method of making 4-imidazolin-2-ones in accordance with this invention. Thus, another embodiment of this invention is the method of preparing 4-imidazolin-2-ones by cyclizing a solution of the appropriate urea in the presence of base. This reaction is set forth schematically as follows

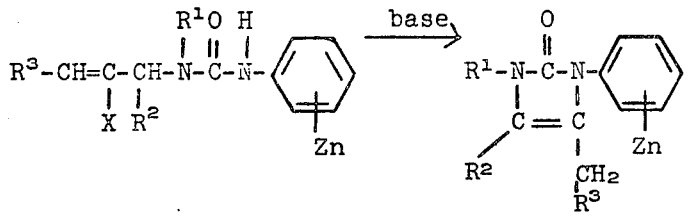

where $R^1$, $R^2$, $R^3$, X, Z and n are as previously defined.

In conducting the cyclizing reaction the temperature of the system can vary over a wide range, for example, from room temperature or below up to the reflex temperature of the system. Generally, good results are obtained at elevated temperatures in the range of about 40° to about 90°C or more dependent upon the solvent employed. Conducting the cyclization at a temperature from about 60° to about 80°C is usually very satisfactory.

This cyclization reaction can be conducted at pressures ranging from subatmospheric to superatmospheric pressure. Usually, the reaction is conducted at normal atmospheric pressure for convience which provides good yields. Suitable solvents which can be used in carrying out this cyclization are, for example, dimethyl sulfoxide, dimethylformamide, tetrahydrofuran, methanol, ethanol, and the like. Selection of an appropriate solvent is not critical. Particularly good results are obtained with ethanol which is preferred. Suitable bases useful in the process of preparing the 4-imidazolin-2-ones are, for example, the hydroxides such as potassium hydroxide, sodium hydroxide, the alkoxides, such as, potassium t-butoxide and other equivalent bases can be used. Usually, an excess of the base is used to assure complete cyclization of the N-(2-halo-2-alken-1-yl) urea. For convience and economy potassium hydroxide is preferred.

The 4-imidazolin-2-ones, prepared by the process of the instant invention, have been previously described in U.S. Pat. No. 3,136,776 to P. J. Stoffel. The preparation of the 4-imidazolin-2-ones described in U.S. Pat. No. 3,136,776 utilizes an alkynyl urea treated with phosphorus pentachloride to prepare a 2-chloro-4-methyl-imidazolium chloride precursor which is treated with a base in an aqueous system to provide the 4-methyl-imidazolin-2-ones. The preparation of the imidazolin-2-ones in accordance with U.S. Pat. No. 3,136,776 is limited by the required use of alkynl derivatives, which are highly unstable and the explosive properties of the alkynl precursors are unsatisfactory in the commercial preparation of the 4-imidazolin-2-ones. The instant process avoids the use of any alkynl derivatives and provides an economical method of preparing the 4-imidazolin-2-ones in good yield without the requirement of employing costly safeguards required by the use of alkynyl derivatives.

In addition to the bacteriostatic activity of the 4-imidazolin-2-ones disclosed in U.S. Pat. No. 3,136,776 the 4-imidazolin-2-ones are useful as intermediates to produce 2-imino derivatives of substituted imidazoles which are effective plant growth regulants as more fully described in pending patent application of G. L. Eilrich and W. D. Dixon, Ser. No. 329,787 filed Feb. 5, 1973.

The invention is further illustrated by the following examples. All parts and percentages are by weight and temperature is in degrees centigrade unless otherwise specified.

EXAMPLE I

Preparation of N-isopropyl 2-chloroallyl amine

To a stirred solution of 297 g (5 mol) of isopropylamine and 127 ml of water in a suitable vessel is added dropruise over a 2 hour period about 133g (1.19 mol) of 2.3-dichloro-1-propene. After the addition the reaction is heated at about 70° for 4 hours, cooled and about 66.6g (1.7 mol) sodium hydroxide is added. After stirring about 30 minutues, the top layer is separated, filtered and dried with solid sodium hydroxide until no more water separated. The liquid, 145.6g, is distilled and after a forerun at 31°/760 mm Hg, the product is collected as a colorless liquid b.p. 135–140/760 mm Hg. yield of N-isopropyl-N-2-chloroallylamine is 129.4g. (81% yield)

EXAMPLE II

Preparation of 1-(2-chloroallyl)-1-isopropyl-3-phenyl urea

To a stirred solution of 11.9g (0.1 mol) of phenyl isocyanate and 200 ml of ether in a suitable vessel is added dropwise 13.3g (0.1 mol) of N-isopropyl-N-2 chloroallyl amine in 50 ml of ether. The reaction is stirred for about 15 hours and the solvent is removed in vacuuo. Upon scratching a solid is obtained. Recrystallization of the product from carbon tetrachloride - pet. ether gives 21.3g (84.7%) of 1-(2-chloroallyl)-1-isopropyl-3-phenyl urea having a melting point of 76°–78°.

Anal. Calcd. for $C_{13}$, $H_{17}$, $N_2O$ Cl: C,61.77; H. 6.78; N, 11.08. Found: C, 61.83; H, 6.89; N, 11.04.

Using the procedure of Example II, but replacing the phenyl isocyanate with an appropriate substituted phenyl isocyanate the following ureas are prepared and set forth as examples.

III 1-(2-chloroallyl)-1-isopropyl-3-O chlorophenyl urea mp. 41°–44°

IV 1-(2-chloroallyl)-1-isopropyl-3-p-tolyl urea mp. 87°–90°

V 1-(2-chloroallyl)-1-isopropyl-3-(3,4-dichlorophenyl) urea mp. 67°–69°

VI 1-(2-chloroallyl)-1-isopropyl-3-(p-ethoxyphenyl) urea mp. 91°–94°

In like manner employing the procedure of Example II but replacing the N-isopropyl-N-2-chloroallyl amine with N-alkyl-N-halo-2-alken-1-yl amines provides the desired 1-alkyl-1-(2-halo-2-alken-1-yl) -3-aryl ureas.

EXAMPLE VII

Preparation of 1-isopropyl-3-(3,4-dichlorophenyl)-4-methyl-4-imidazolin-2-one

To a stirred suspension of finely powdered potassium hydroxide, 12g in 35ml of dimethyl sulfoxide at 65° is added, dropwise over a period of about 30 minutes, a solution of 53.4g (0.16 mol) of 1-(2-chloroallyl)-1-isopropyl-3-(3,4-dichorophenyl urea in 75ml of dimethyl sulfoxide. The reaction is heated 20 hours at about 70° and cooled and poured over ice. A solid product is obtained which is removed by filtration and air dried, 45.1g (99% yield). Recrystallization of the product from ethyl acetate - pet. ether provides 40.3g (89% yield) of 1-isopropyl-3-(3,4-dichlorophenyl)-4-methyl-4-imidazolin-2-one having a melting point of 110°–111° C. The following structure is confirmed by IR and NMR spectral anaylsis.

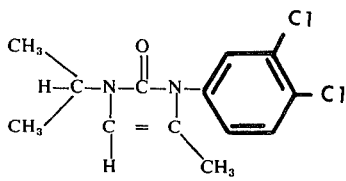

Anal. Calcd. for $C_{13}H_{14}N_2O\ Cl_2$: C, 54.75; H. 4.95; N, 9.82. Found: C, 55.14; H, 5.20; N, 9.88.

Following the procedure of Example VII but replacing the urea with other appropriate ureas the following compounds are prepared.

VIII 1-isopropyl-3-phenyl-4-methyl-4-imidazolin-2-one

IX 1-isopropyl-3-p-ethoxyphenyl-4-methyl-4-imidazolin-2-one

X 1-isopropyl-3-o-chlorophenyl-4-methyl-4-imidazolin-2-one

XI 1-isopropyl-3-p-tolyl-4-methyl-4-imidazolin-2-one

Similar results are obtained using the procedure of Example VII but replacing potassium hydroxide with sodium hydroxide, potassium t-butoxide or other similar bases. In like manner the dimethyl sulfoxide can be replaced with ethanol. The use of ethyl alcohol and potassium hydroxide is preferred.

The 4-imidazolin-2-ones prepared by the method of this invention are useful in a new process for making 2-imino derivatives of imidazoles. This new process is the subject of a sole application of William D. Dixon filed concurrently herewith, Ser. No. 376,493 filing date July 5, 1973, now U.S. Pat. No. 3,887,577.

Although this invention has been described with respect to specific modifications, the details thereof are not to be construed as limitations, for it will be apparent that various equivalents, changes and modifications may be resorted to without departing from the spirit and scope thereof and it is understood that such equivalent embodiments are intended to be included herein.

The embodiments of the invention in which an exclusive property or privilege is claimed are defined as follows:

1. A process for preparing a compound of the formula

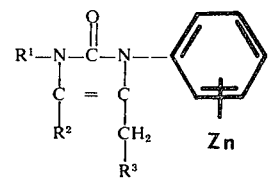

wherein $R^1$ is lower alkyl, $R^2$ is lower alkyl or hydrogen, $R^3$ is lower alkyl or hydrogen, Z is independently fluoro, chloro, bromo, lower alkyl, halo lower alkyl or lower alkoxy and $n$ is an integer zero through 2 which comprises cyclizing a solution of a compound of the formula

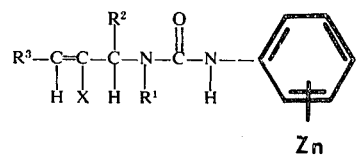

wherein $R^1$, $R^2$, $R^3$, Z and $n$ are the same as hereinabove defined and X is halo in the presence of a base at a temperature in the range of about 20°C. to the reflux temperature of the system.

2. The process of claim 1 wherein the urea is in solution with dimethyl sulfoxide.

3. The process of claim 1 wherein the urea is in solution with ethyl alcohol.

4. The process of claim 1 wherein the base is potassium hydroxide.

5. The process of claim 1 wherein a solution of 1-(2-chloroallyl)-1-isopropyl-3-(3,4-dichlorophenyl) urea in ethyl alcohol is cyclized with potassium hydroxide at a temperature of about 65° C.

* * * * *